(12) United States Patent
Voris et al.

(10) Patent No.: US 10,140,754 B1
(45) Date of Patent: Nov. 27, 2018

(54) GRAPHICAL USER INTERFACE SYSTEM AND METHOD FOR MODELING LIGHTING OF AREAS CAPTURED BY LOCATION SCOUTS

(71) Applicant: Disney Enterprises, Inc., Burbank, CA (US)

(72) Inventors: James Voris, Burbank, CA (US); Steven M. Chapman, Burbank, CA (US); Benjamin F. Havey, Burbank, CA (US); Joseph Popp, Burbank, CA (US); Mehul Patel, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/670,974

(22) Filed: Aug. 7, 2017

(51) Int. Cl.
*G06T 15/50* (2011.01)
*G06F 3/0484* (2013.01)
*G06T 19/20* (2011.01)
*G06T 15/55* (2011.01)
*G06T 15/60* (2006.01)
*G06T 15/80* (2011.01)

(52) U.S. Cl.
CPC ........ *G06T 15/506* (2013.01); *G06F 3/04845* (2013.01); *G06T 15/55* (2013.01); *G06T 15/60* (2013.01); *G06T 15/80* (2013.01); *G06T 19/20* (2013.01)

(58) Field of Classification Search
CPC ............................ G06T 17/00; H04N 5/23229
See application file for complete search history.

(56) References Cited

U.S. PATENT DOCUMENTS 9,860,453 B2 * 1/2018 Matthews .......... H04N 5/23229
2015/0310667 A1 * 10/2015 Young ..................... G06K 9/46
345/633

* cited by examiner

*Primary Examiner* — Thomas J Lett
(74) *Attorney, Agent, or Firm* — Sheppard Mullin Richter & Hampton LLP

(57) ABSTRACT

Techniques described herein are directed to simulating lighting conditions of a real-world location in advance of beginning video production at the location. As described herein, captured data (e.g., captured images, captured video, and/or scanned three-dimensional data) of a candidate outdoor location may be used to generate a three dimensional model of the outdoor location. Thereafter, a simulation software application may be used to provide a graphical user interface for rendering the three dimensional model of the location under a variety of different lighting conditions. In particular implementations, the simulation software application may be used to render the location under a variety of different light conditions corresponding to different times of day.

22 Claims, 9 Drawing Sheets

GRAPHICAL USER INTERFACE SYSTEM AND METHOD FOR MODELING LIGHTING OF AREAS CAPTURED BY LOCATION SCOUTS

DESCRIPTION OF THE RELATED ART

Presently, decisions as to whether to shoot a movie or television series at a location are made by people called "scouts" who are sent to the site. A location scout will examine the environment, capture photos (and possibly video) of the area, and send this information back to the production team. The production team is then tasked with determining whether or not to shoot at the proposed location using this very limited data. This manner of deciding whether to shoot all or some of a movie/series at a given location is inherently risky, as the average cost to produce a major studio movie can be significant (ranging in the tens of millions of dollars or even greater) and the suitability of the location can play a significant role in the production's success.

BRIEF SUMMARY OF THE DISCLOSURE

Techniques described herein are directed to simulating lighting conditions of a real-world location in advance of beginning video production at the location.

In one embodiment, a method includes: capturing data of an outdoor, real-world location; using the captured data, generating a three dimensional model of the outdoor, real-world location; presenting a graphical user interface to a user for simulating lighting of the location under multiple sun conditions, where lighting of the location is simulated using the three dimensional model; receiving data corresponding to user input at the graphical user interface actuating a graphical user interface control for selecting one of the sun conditions; and in response to receiving the data, rendering the three dimensional model of the location with lighting based on the selected sun condition.

In implementations, the lighting of the location may be simulated using a sun model including illumination parameters, the illumination parameters including at least one of: sun position or direction, sun angular variation, sun spatial variation, and sun color. In these implementations, rendering the three dimensional model of the location with lighting based on the selected sun condition may include applying the selected sun condition to the sun model. In some implementations, the method may include: selecting the sun model to simulate lighting of the location, where the sun model is selected using at least one of: geographical identification metadata identifying a location of the outdoor, real-world location, weather data of the of the outdoor, real-world location, and a time of day in which the lighting of the location is being simulated.

In implementations, the lighting of the location may be simulated using a sky model including illumination parameters, the sky illumination parameters including at least one of: sky color, sky angular variation, sky turbidity, or the zenith angle of light direction. In some implementations, a sun model and sky model may be used to simulate the lighting of the location.

In some implementations, the method includes: displaying the graphical user interface control, where the graphical user interface control is associated with a time of day, and where the user input actuating the graphical user interface control includes selecting a time of day to simulate lighting conditions of the location.

In some implementations, the method includes: receiving geographical identification metadata identifying a location of the outdoor, real-world location, and simulating lighting of the location using the geographical identification metadata.

In some implementations, the method includes: receiving weather data of the outdoor, real-world location, and simulating lighting of the location using the weather data.

In a particular implementation, capturing data of the outdoor, real-world location includes capturing multiple digital images using an unmanned aerial vehicle. In this implementation, the plurality of captured digital images may be used to generate the three-dimensional model.

In a particular implementation, capturing data of the outdoor, real-world location includes scanning the outdoor, real-world location using a LIDAR unit attached to an unmanned aerial vehicle. In this implementation, generating the three-dimensional model may include generating a three-dimensional point cloud using data acquired by the LIDAR unit. In some implementations, the unmanned aerial vehicle may capture digital images of the outdoor, real-world location in addition to using a LIDAR unit to scan the location.

In some implementations, a head mounted display may render the three dimensional model of the location with lighting based on the selected sun condition.

As used herein to describe a user interface (UI) or graphical user interface (GUI), the term "user input" generally refers to any user action that generates data that triggers one or more actions at the UI (e.g., the selection of sun and/or sky conditions, the rendering of a three-dimensional model of a location, the selection of graphical controls, etc.). User input may include, for example, a touch user interface gesture (e.g., taps, holds, swipes, pinches, etc.), vocal input (e.g., voice commands that are digitized and translated into a corresponding action), a keyboard input (e.g., pressing a keyboard key), a mouse input (e.g., clicking and/or moving a mouse pointer), and the like. User input may include a sequence of inputs, such as a particular sequence of touch gestures, voice commands, and/or key presses. User input may select, modify, or otherwise manipulate a displayed graphical control element such as, for example, buttons, checkboxes, menus, windows, sliders, navigational control elements, and the like.

As used herein, the term "virtual reality" or "VR" generally refers to a simulation of a user's presence in an environment, real or imaginary, such that the user may interact with it.

Other features and aspects of the disclosed method will become apparent from the following detailed description, taken in conjunction with the accompanying drawings, which illustrate, by way of example, the features in accordance with embodiments of the disclosure. The summary is not intended to limit the scope of the claimed disclosure, which is defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments of the disclosure.

The figures are not exhaustive and do not limit the disclosure to the precise form disclosed.

DETAILED DESCRIPTION

As noted above, current methods of scouting locations in advance of film or television production provide limited information on which significant decisions may be made. Techniques described herein address this problem. As described herein, captured data (e.g., images, video, and/or scanned three-dimensional data) of a candidate outdoor location may be used to generate a three dimensional model of the outdoor location by employing three-dimensional modeling techniques such as photogrammetry. Thereafter, a simulation software application may be used to provide a graphical user interface for rendering the three dimensional model of the location under a variety of different simulated sun and/or sky conditions. For example, the lighting appearance (e.g., chrominance, luminance, shadowing, albedos, reflectance, etc.) of the location may be simulated for a variety of different times of day and year for which sun conditions (e.g., sun position) and sky conditions (e.g., overcast, clear skies, cloudy, foggy, etc.) may vary.

The techniques described herein may introduce significant benefits to production planning with respect to new locations. First, by providing a means of remotely simulating what production camera shots will generally look like at a particular location, an initial decision can be made as to whether a location will be worth the production costs. Second, simulation of the location under a variety of different sun and sky conditions may be useful for planning in advance the best time of day and/or year for sending out a production crew to film at a location, which may help reduce the time consumed by reshoots and otherwise optimize the shooting schedule.

In one embodiment, a method of simulating the lighting conditions of an outdoor location includes: receiving a three-dimensional model of the outdoor location; selecting a sun model and a sky model to model the lighting of the location; selecting sun conditions and sky conditions to apply to the sun model and the sky model; and rendering the three dimensional model of the outdoor location with lighting based on the selected sun and sky models and the sun and sky conditions. In additional implementations, the method may further include: inserting a virtual object into the rendered three-dimensional model and lighting the virtual object using the selected sun and sky models and sun and sky conditions.

In some implementations, the method may be implemented by rendering the three-dimensional model using a VR head mounted display (HMD). In the production context, this may allow a director or other member of the production team to preview what a shot at a location will look like from a variety of different angles at different times of day. In this manner, a very accurate shot list may be created before filming at a location.

Figure 1:
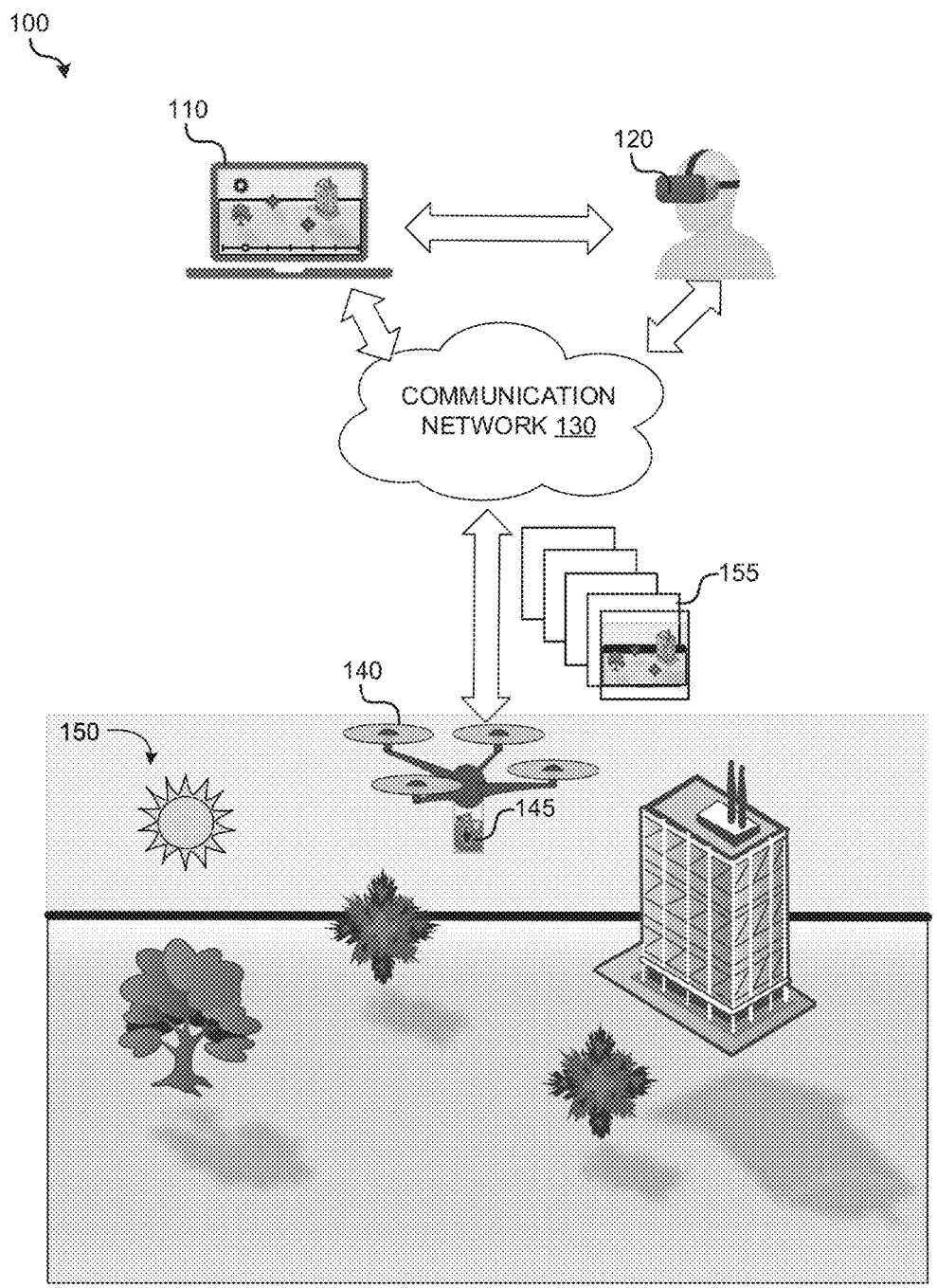
FIG. 1 illustrates an example environment 100 in which the disclosure may be implemented.
Figure 2:
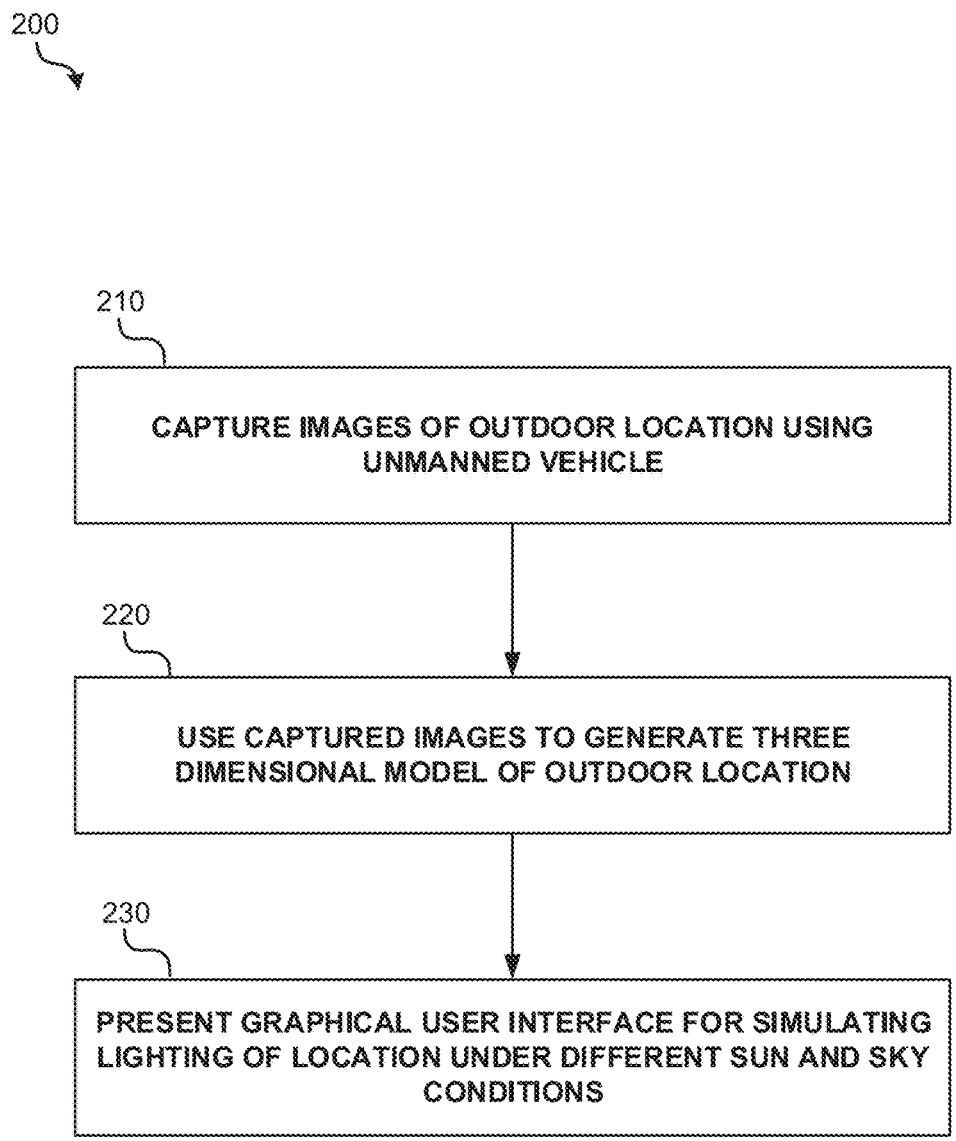
FIG. 2 is an operational flow diagram illustrating an example method for scouting an outdoor location and simulating the lighting conditions of the outdoor location in accordance with embodiments.

FIG. 1 illustrates an example environment 100 in which the disclosure may be implemented. FIG. 1 will be described together with FIG. 2, which is an operational flow diagram illustrating an example method 200 for scouting an outdoor location and simulating the lighting conditions of an outdoor location in accordance with embodiments.

Prior to producing video content at an outdoor location, the location may be scouted. As such, at operation 210, an unmanned vehicle (e.g., an unmanned aerial or ground vehicle) may capture images (e.g., photographs or video frames) of the outdoor location. As illustrated in example environment 100, an unmanned aerial vehicle (UAV) 145 such as a drone may be remotely controlled to scout an outdoor location 150 and use camera 145 (e.g., an omnidirectional camera) to capture a plurality of images 155 of location 150. For example, a member of a video production team may remotely control UAV 145 to capture images within a particular geographical location. Alternatively, in another implementation, UAV 145 may automatically scout and capture images 155 of location 150 using a global positioning system (GPS) in combination with predefined geographical coordinate boundaries for location 150 such as latitude, longitude, and altitude. It should be noted that although embodiments described herein will primarily be described with reference to using the latitude, longitude, and altitude of a location, in alternative implementations, only the latitude and longitude may be used.

Utilizing an aerial unmanned vehicle in this context may facilitate traversal of outdoor location 150 and may allow image capture from a variety of different angles. Alternatively, in other implementations, location scouting and image capture may be accomplished by a person manually capturing images on foot, by capturing images from space, by capturing images from a manned aerial or terrestrial vehicle, or using other suitable means. The number of captured images 155 may depend on a minimum threshold needed to create a 3D model of the outdoor location, a desired accuracy of the 3D model, the size of the outdoor location, and specifications of camera 145 (e.g., field of view, resolution, dynamic range, etc.)

In some implementations, LIDAR or other three-dimensional scanning technologies may be utilized in place of photography and photogrammetry to capture (and subsequently model) the outdoor location 150. For example, UAV 145 may be mounted with a LIDAR unit including a laser and sensor. As UAV 145 traverses the environment, the laser may emit pulsed light that is reflected back to the sensor, and differences in wavelengths and/or return times of the reflected laser as measured by the sensor may be used to subsequently generate a 3D point cloud and model of the location 150. Other examples of 3D scanning technologies that may be utilized include other laser pulsed-based or phase-shift 3D scanning technologies, laser triangulation 3D scanning technologies, and structured light 3D scanning technologies.

Alternatively, in some implementations, LIDAR or other three-dimensional scanning technologies may be used to enhance the images 155 of captured location 150 (e.g., by providing relative distances of the different areas of the environment as shown in the images). This additional information (e.g., distance information) may be subsequently used to improve the accuracy of the photogrammetric 3D model of the environment that is created. For instance, a 3D point cloud acquired from a LIDAR scanner may be matched with the captured digital images of the scanned area (e.g., on a pixel by pixel basis) to generate a more accurate 3D model. In such implementations, the optical axes of the camera 145 and LIDAR unit may be aligned, and image capture may be synchronized with LIDAR scanning.

In implementations, geographical identification metadata (i.e., geotags) such as latitude, longitude, and latitude information may be added to the captured images 155. For example, UAV 140 may include a GPS receiver (e.g., a differential GPS receiver) that receives positional information from a plurality of satellites to determine geographic coordinates. As further described below, image geotags may assist in determining what sun model/sky model and sun conditions/sky conditions to apply to the modeled location.

Following capture of images 155, UAV 140 may transmit the captured images 155 to one or more user devices over communication network 130 (e.g., a radio frequency network, a BLUETOOTH network, an infrared network, a wired network, etc.). The user devices may include a smartphone, a tablet, a laptop, a desktop computer, a server, a wearable device such as a HMD, or other suitable device that may be used to create a 3D model of the location and/or simulate the lighting conditions of the location. Alternatively, UAV 140 may transmit images 155 to an intermediary device that then transmits the images 155 to a user device that creates the 3D model of the location and/or simulates the lighting conditions of the location. As illustrated in example environment 100, the images 155 are made available to a laptop 110 and a HMD 120 in communication with laptop 110.

Following receipt of captured images 155, at operation 220, a user device (e.g., user devices 110 or 120) may use the captured images to generate a 3D model of the outdoor location 150. The generated 3D model may be a polygonal model, a curved model, a digitally sculpted model, or other suitable model. A variety of photogrammetric techniques may be used to generate the 3D model. In one implementation, two dimensional images may be aligned by finding common points and matching their positions. As more points are found and matched, the position at which each photo was taken can be determined, and a sparse point cloud can be created. A dense point cloud can be generated by interpolating points on the sparse point cloud, using the images to add more detail. The dense point cloud can be converted into a wireframe model, and a surface can be filled in on the wireframe model, creating a mesh. In a particular implementation, a 3D model may be created by using a large-scale structure-from-motion (SfM) algorithm that recovers a triangular mesh. Alternatively, as discussed above, in some implementations, a 3D model may be generated using a 3D point cloud created by laser pulsed-based scanning (e.g., LIDAR scanning) or other three-dimensional scanning of the location.

In implementations, the effectiveness of the 3D model for simulating lighting of the actual location may be enhanced by texture mapping the 3D model (e.g., adding color, surface texture, reflectivity, transparency, or other detail) to capture details such as concrete on buildings, canvas on awnings, glass in windows, highly reflective surfaces, etc. One or more texture images having one or more dimensions may be applied to the 3D model.

Following creation of the 3D model of the outdoor location, at operation 230, a GUI may be presented for simulating the appearance of the location (e.g., location 150) under a variety of lighting conditions (e.g., different sun and sky conditions). By implementing this GUI, the expected appearance of production shots at different times of day and year may be simulated. Example implementations of this graphical user interface along with techniques for modeling sun and sky conditions are further described below.

Figure 3A:
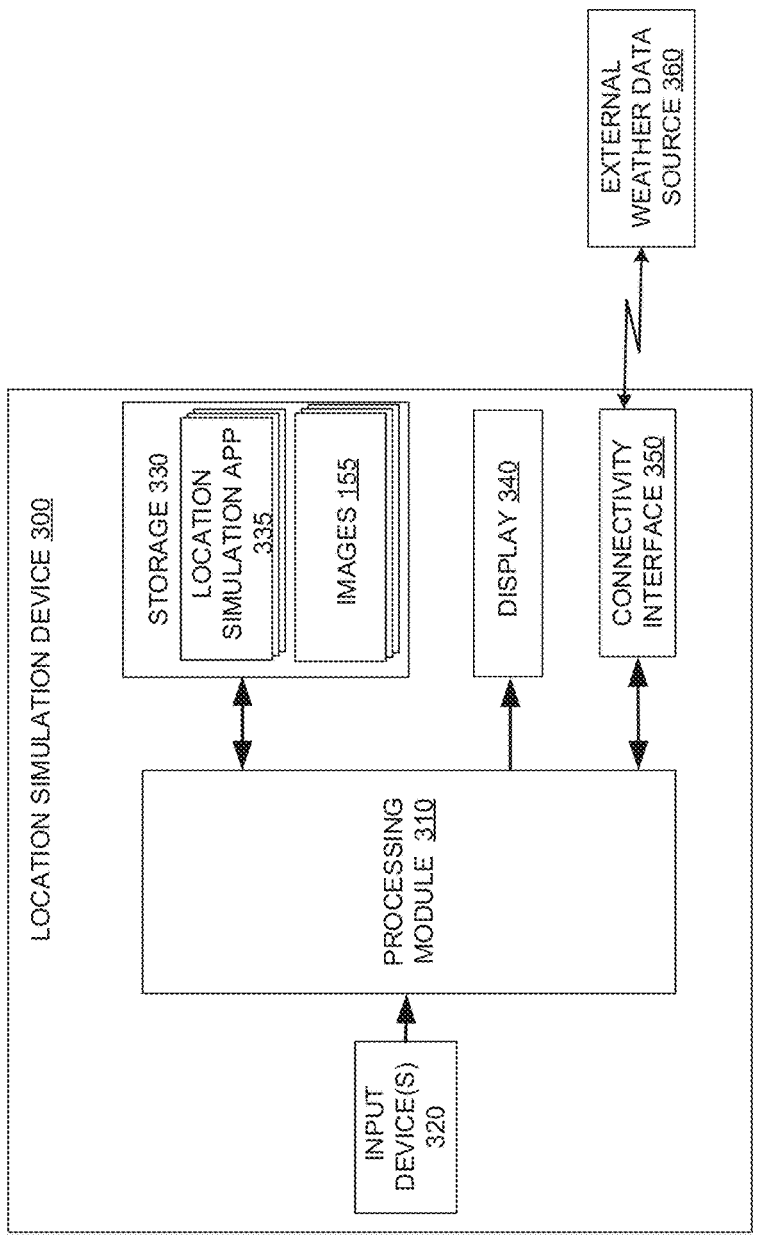
FIG. 3A is a block diagram illustrating an example location simulation device that may implemented in embodiments to simulate lighting conditions of an outdoor location by running a location simulation application.
Figure 3B:
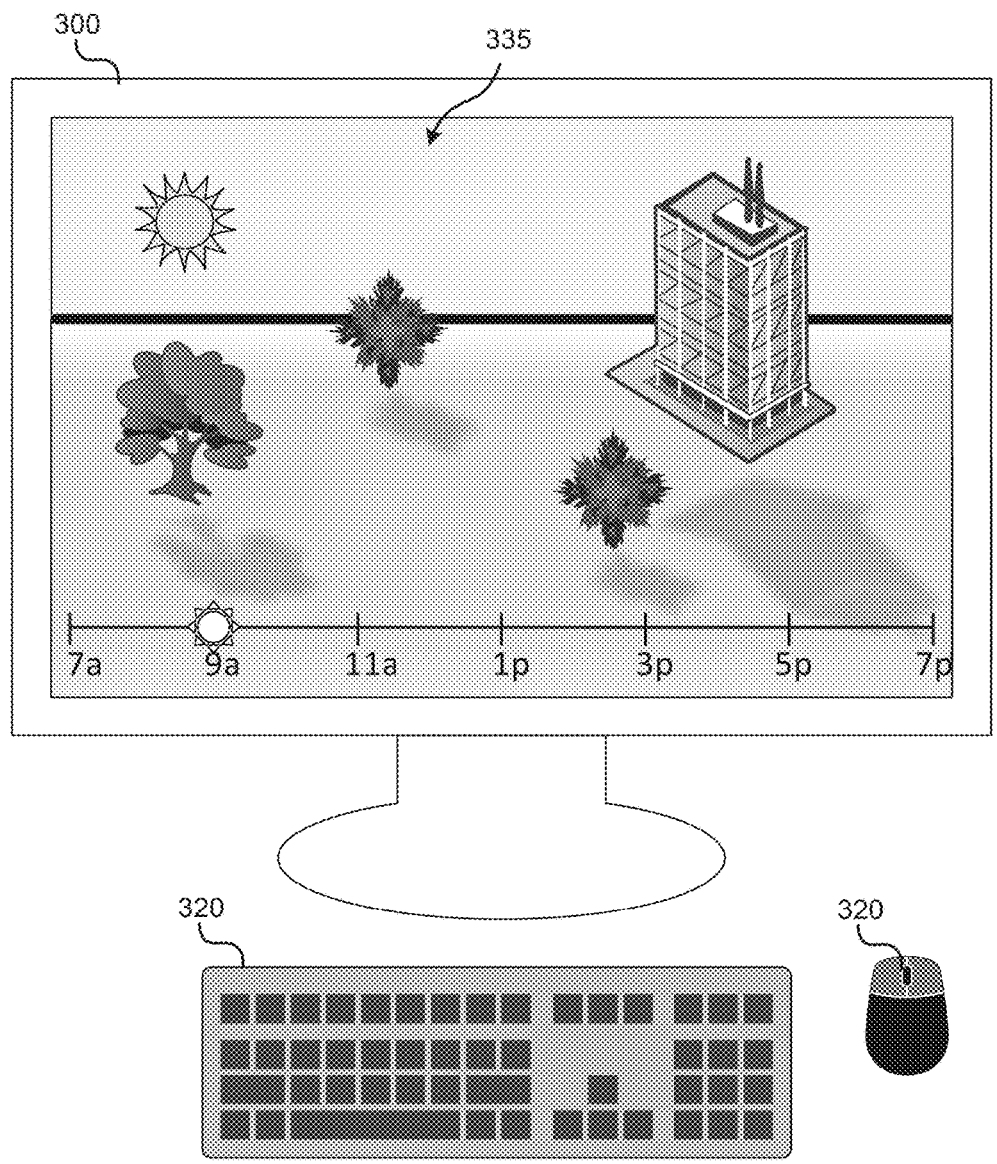
FIG. 3B illustrates the location simulation device of FIG. 3A displaying an example graphical user interface of the location simulation application of FIG. 3A.

FIG. 3A is a block diagram illustrating an example location simulation device 300 that may implemented in embodiments to simulate lighting conditions of an outdoor location 150 by running a location simulation application 335. FIG. 3B illustrates location simulation device 300 displaying an example graphical user interface of location simulation application 335. As illustrated in this example, location simulation device 300 is a desktop computer. However, in other implementations, location simulation device 300 may comprise a HMD, a smartphone, a tablet, a laptop, a server system, or other suitable device. Location simulation device may including a processing module 310, input devices 320 (e.g., mouse, keyboard, touchscreen display), a storage 330, a display 340, and a connectivity interface 350.

Storage 330 may comprise volatile memory (e.g. RAM), non-volatile memory (e.g. flash storage), or some combination thereof. In various embodiments, storage 330 stores a location simulation application 335, that when executed by processing module 310 (e.g., a digital signal processor), presents a GUI for simulating lighting conditions (e.g., sun and sky lighting) of an outdoor location 150. Prior to simulating the lighting conditions of the outdoor location, location simulation application 335 may also create a 3D model of the location from stored images 155 using photogrammetric techniques as described above.

In implementations where location simulation device 300 is a VR HMD, in addition to a head mounted display, the device may also include a motion sensor (e.g., accelerometer and/or gyroscope) for generating electronic signals representative of the motion or position of the VR device. These electronic input signals may be received and processed by circuitry of processing module 310 during a VR simulation of the location under different lighting conditions to determine the motion of a user of the VR device and hence, an orientation (e.g., in the north-east-south-west (NESW) and up-down planes) of the user relative to the rendered simulated location.

Connectivity interface 350 may connect location simulation device 300 to external weather data sources 360 through a communication medium using one or more communication protocols. For example, connectivity interface 350 may comprise a network interface card, a cellular transceiver, or some other interface for connecting location simulation device 300 to the Internet. As further described below, external weather data sources may provide historical, present, or predicted weather information that may be used as data inputs by location simulation application to specify sun and sky conditions for simulating the lighting of a location. For example, external weather data sources may comprise WEATHER UNDERGROUND, ACCUWEATHER, a doppler weather radar map, The National Weather Service, or other weather data source that provides past, present, or predicted weather information for the simulated location.

Figure 4:
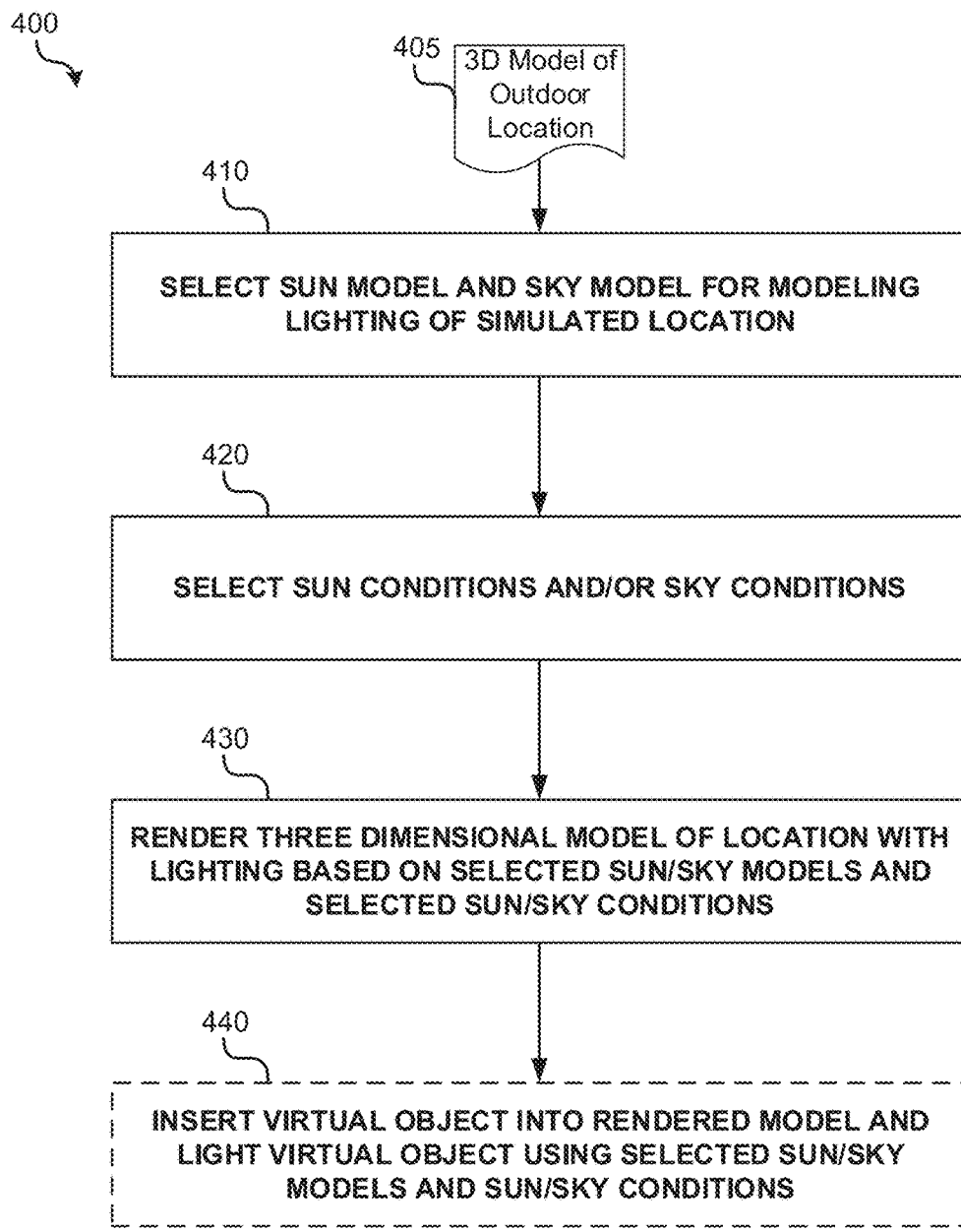
FIG. 4 is an operational flow diagram illustrating an example method that may be performed by a location simulation application to simulate lighting conditions of an outdoor location.

FIG. 4 is an operational flow diagram illustrating an example method 400 that may be performed by location simulation application 335 to simulate lighting conditions of an outdoor location. Method 400 will be described in conjunction with FIGS. 5A-5E, which visually illustrate an exemplary GUI that may be used as part of application 335 to simulate different lighting conditions (e.g., sun and sky conditions) of a 3D model of an outdoor location 405. It should be noted that although the exemplary GUI of FIGS. 5A-5E illustrates simulation from a single perspective, the GUI may provide various controls for moving the "camera" around the simulated location (e.g., in a latitudinal, longitudinal, or altitudinal direction) and for changing the field of view of the simulated location (e.g., by zooming, tilting, panning, or rolling the camera view). Prior to implementing method 400, application 335 may also be used to create 3D model 405 (e.g., by importing a set of images 155 of the outdoor location and applying photogrammetry).

At operation 410, a sun model and sky model may be selected for modeling the lighting of the simulated location. In implementations, the sun and sky may be modeled together or separately. Moreover, in some implementations, only the sun may be modeled (e.g. clear skies may be assumed).

The sun model may comprise a plurality of parameters for modeling the lighting of the sun. For example, the sun model may comprise the illumination parameters of sun position or direction, sun angular variation or spatial variation, and/or sun color. Each illumination parameter may comprise one or more dimensions. For example, sun color may be modeled in three dimensions using an RGB color representation. In one embodiment, the sun may be modeled with a von-Mises Fisher (vMF) distribution as described in A. Banerjee, I. S. Dhillon, J. Ghosh, and S. Sra. *Clustering on the unit hypersphere using von mises-fisher distributions.* Journal of Machine Learning Research, 6:1345-1382, 2005. In this embodiment, the vMF distribution is used to model the intensity of the sun's light direction in an RGB color channel as a function of the direction, color, and diffuseness of the sun. In another embodiment, the sun may be modeled with a double-exponential distribution as described in U.S. patent application Ser. No. 14/614,214, which is incorporated herein by reference. In other embodiments, other sun models may be used.

The sky model may similarly comprise a plurality of illumination parameters of one or more dimensions for modeling the lighting of the sky. For example, the sky model may comprise the illumination parameters of sky color, sky angular variation, sky turbidity, and/or the zenith angle of light direction. In one embodiment, the sky may be modeled using the vMF distribution in a similar manner to that described above. In an alternative embodiment, the sky may be modeled using a Preetham model as described in A. J. Preetham, P. Shirley, and B. Smits. *A practical analytic model for daylight*, in SIGGRAPH, August 1999. In yet another embodiment, the sky may be modeled using the classic non-uniform sky model (cosine model) described in P. Moon and D. E. Spencer. *Illumination from a non-uniform sky*, in Transactions of the Illumination Engineering Society, 37, 1942, which may be used to represent the sky variation using a weighted cosine term. In other embodiments, other sky models may be used.

In some implementations, the selected sun and sky models may depend on the characteristics of the simulated location (e.g., topography, number of objects, reflectivity of objects, etc.) and the weather conditions at the time of day and time of year in which the location is being modeled. For example, certain sun/sky models may provide a higher degree of accuracy in modeling overcast weather conditions, whereas other sun/sky models may provide a higher degree of accuracy in modeling clear sky conditions. As another example, certain sun/sky models may perform better than others when there is a high degree of reflectivity in the simulated location (e.g., many reflective buildings). In some implementations, a sun and/or sky model for the location may be selected depending on the geocoordinates associated with the simulated location in combination with external data provided by external weather data sources 360 (e.g., past, present, or predicted weather conditions) for those geocoordinates.

Figure 5A:
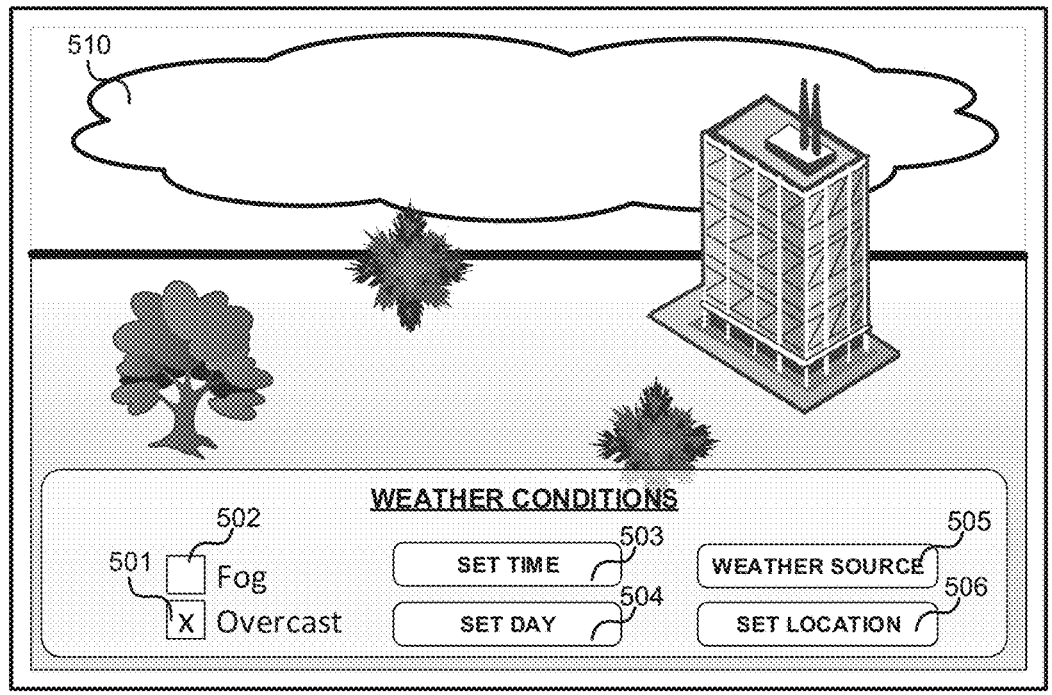
FIG. 5A visually illustrates an exemplary GUI that may be used as part of location simulation application to simulate different lighting conditions (e.g., sun and sky conditions) of a 3D model of an outdoor location.

Following selection of a sun model and sky model, at operation 420, sun conditions and sky conditions may be selected for the selected sun and sky models. FIG. 5A illustrates an example GUI of application 335 that displays a simulated location along with GUI controls 501-506 for selecting and modifying the sun and sky conditions of the simulated location. As illustrated, GUI controls may include a selection control 503 for setting a time of day, a selection control 504 for setting a day of the year, a weather source control 505 for specifying an external weather data source from which to retrieve weather data (that may be used to further specify sun/sky conditions), and a location setting control 506 for setting a geographical location of the simulated location. Additionally, the GUI controls may include controls for specifying weather conditions such as an overcast control 501 and a fog control 502. It should be noted that the GUI controls illustrated in this example are only exemplary, and that a variety of different GUI controls (e.g., buttons, checkboxes, menus, windows, sliders, navigational control elements, and the like) may be implemented.

Depending on the user's selection and manipulation of the GUI controls, illumination parameters associated with the selected sun and sky models may be modified. By way of example, modifying the time of day during which lighting is shown for the simulated location may correspondingly modify an illumination parameter associated with the sun's position in the sky. Providing GUI controls in this manner may provide an intuitive way to temporally simulate the appearance of the location at different times of day and/or year. Alternatively, in some implementations, a user of application 335 may directly select sun conditions and sky conditions by specifying the values of sun/sky illumination parameters described above (e.g., sun position, sun angular variation or spatial variation, sun color, sky color, sky angular variation, sky turbidity, zenith angle of light direction, etc.).

In some implementations, sun and sky conditions may be set based on historical weather data for the location retrieved from one or more external weather data sources 360 (e.g., based on geocoordinates of the location). For example, if filming is scheduled for the spring during the morning hours, historical weather data for this time frame may be retrieved and used to inform the sun and sky conditions of the simulated location. In other implementations, sun and sky conditions may be set based on current weather data for the location. For example, if filming is scheduled in an hour, and the current weather data indicates that the location is overcast, the location may be simulated under these weather conditions prior to making a decision to proceed with filming at that time. In yet further implementations, sun and sky conditions may be based on predicted weather data for the location retrieved from one or more external weather data sources 360.

At operation 430, a 3D model of the location with lighting may be rendered based on the selected sun and sky models and the selected sun and sky conditions. FIG. 5A illustrates one such rendering of a location 150 after overcast conditions have been specified through a control 501. As illustrated in the example of FIG. 5A, a cloud covering digital object 510 may be graphically rendered to simulate overcast sky conditions. In this case, no shadows are rendered to simulate the overcast conditions of the location.

Figure 5B:
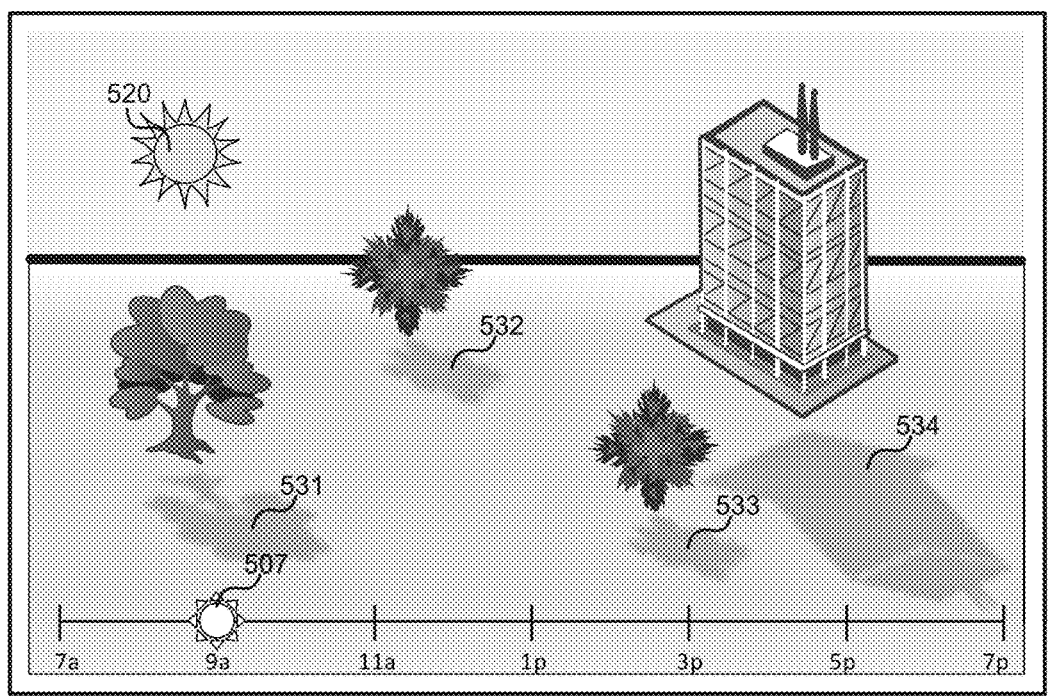
FIG. 5B visually illustrates an exemplary GUI that may be used as part of location simulation application to simulate different lighting conditions (e.g., sun and sky conditions) of a 3D model of an outdoor location.
Figure 5C:
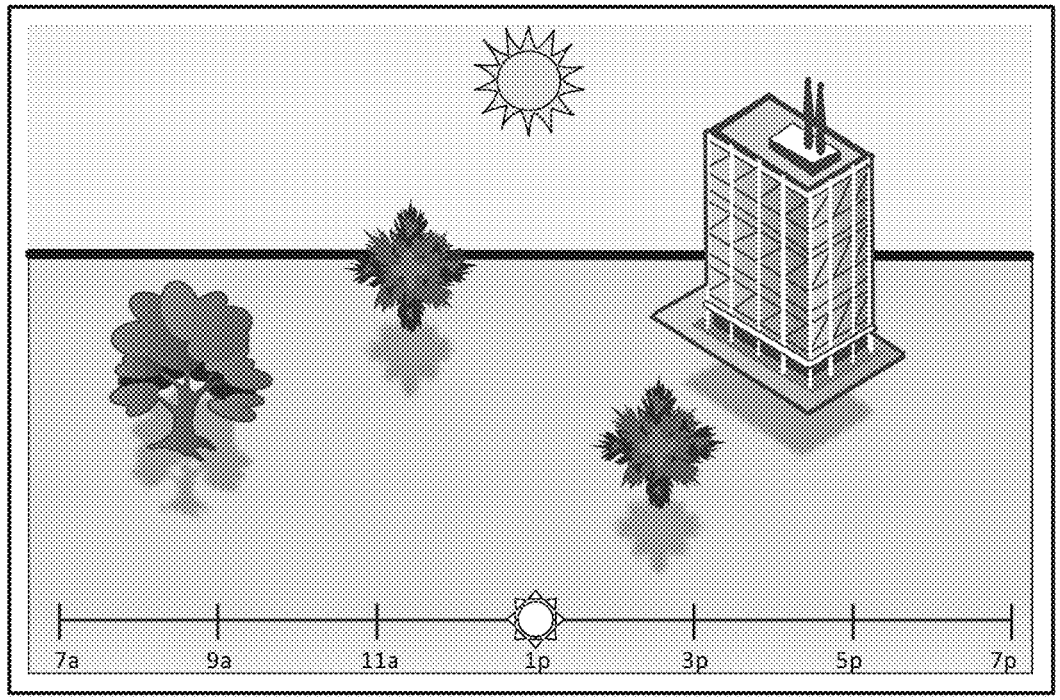
FIG. 5C visually illustrates an exemplary GUI that may be used as part of location simulation application to simulate different lighting conditions (e.g., sun and sky conditions) of a 3D model of an outdoor location.
Figure 5D:
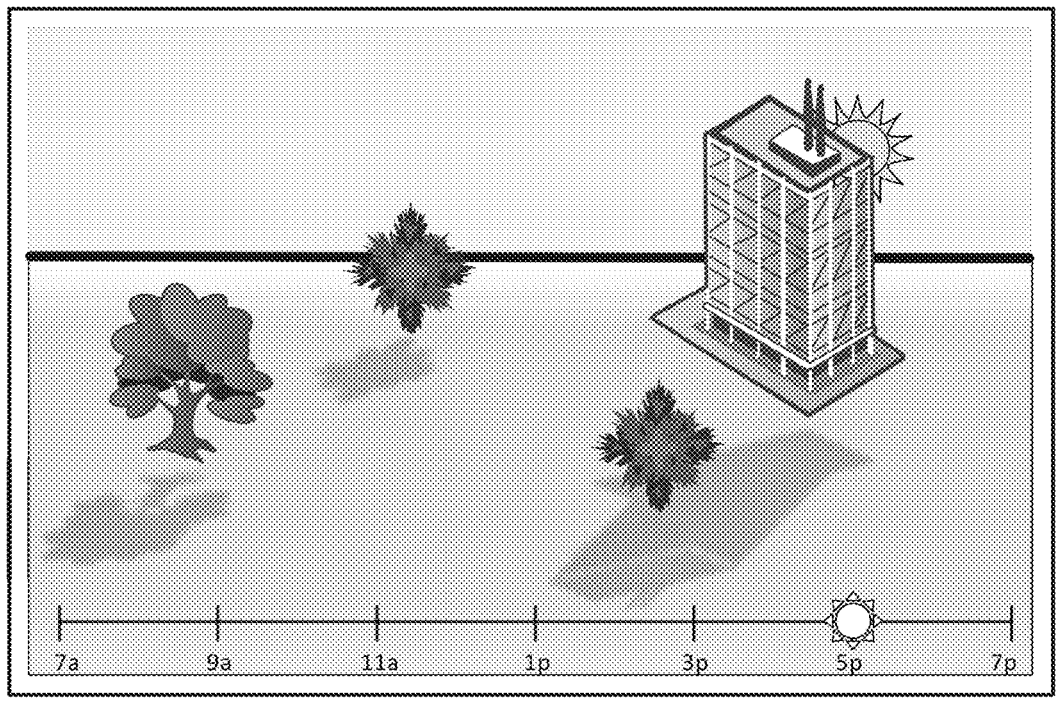
FIG. 5D visually illustrates an exemplary GUI that may be used as part of location simulation application to simulate different lighting conditions (e.g., sun and sky conditions) of a 3D model of an outdoor location.

Each time a user of the GUI specifies new sun or sky conditions, the location may be rerendered with the new lighting. FIGS. 5B-5D illustrate one such example in the context of temporally simulating the appearance of a location throughout a day having clear skies. As illustrated in this example, a slider 507 may be provided for selecting a time of day to simulate the appearance of the location. For example, in FIG. 5B the slider is set to 9 a.m. and the location is rendered with the sun positioned as having recently risen from the East. As also illustrated in this example, shadows 531-534 are also rendered for the scene. Other example lighting conditions that could be rendered, depending on the sun position, might include the coloring of the location, the reflectance of certain objects in the location, and other lighting conditions. In the example of FIG. 5C, the slider is set to 1 p.m. and the location is rendered with the sun at around its highest point of the day, between the East and West. Shadows 531-534 are rerendered based on the sun's position at 1 p.m. In the example of FIG. 5D, the slider is set to 5 p.m. and the location is rendered with the sun positioned as beginning to set in the west. Again, shadows 531-534 are rerendered based on the sun's position at 5 p.m.

Figure 5E:
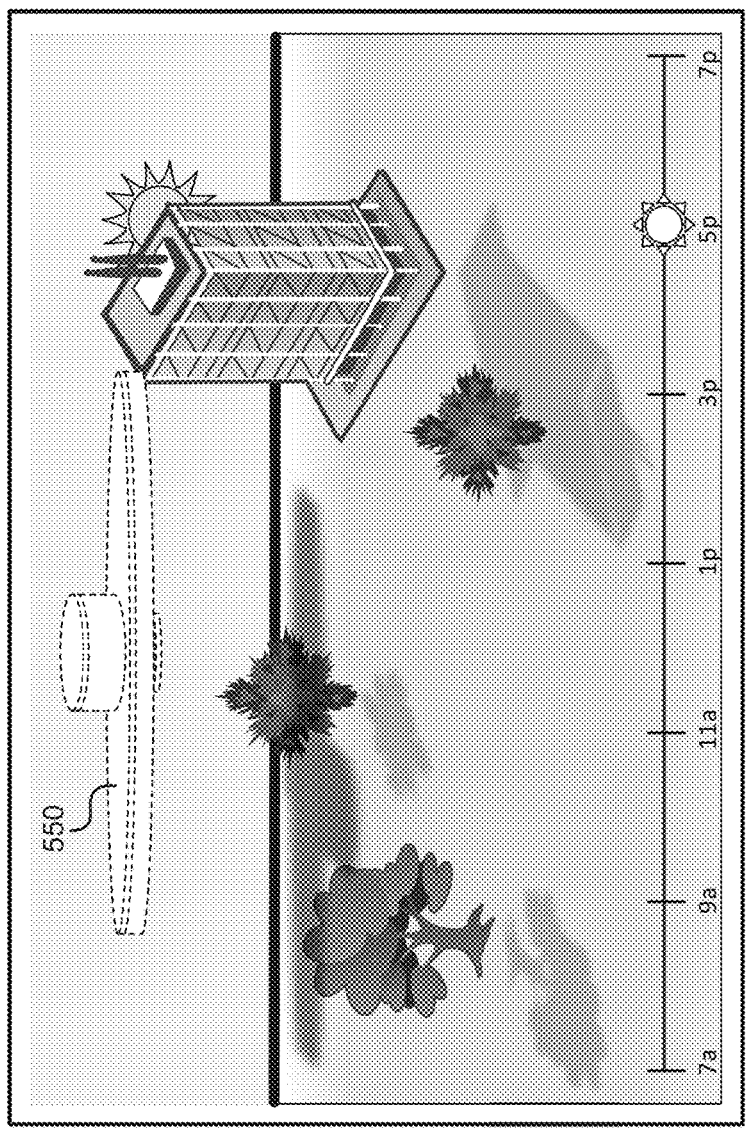
FIG. 5E visually illustrates an exemplary GUI that may be used as part of location simulation application to simulate different lighting conditions (e.g., sun and sky conditions) of a 3D model of an outdoor location.

In some implementations, the appearance of real world objects that may be used during film production may also be simulated. This information may further be used to inform a production team of the desirability of filming at a particular location or filming at that location during a particular time. As such, at operation 440, a virtual object representing a real world object may be inserted into the rendered location and lighted using the selected sun/sky models and sun/sky conditions. FIG. 5E illustrates one such example of operation 440. As shown a virtual object 550 is inserted into the simulated location and lighted using the current sun/sky conditions at 5 p.m.

In some implementations, the simulation of the location under different lighting conditions may be rendered through the perspective of different camera lens. For example, the location may be rendered as if were being viewed through a fisheye lens, a wide angle lens, an aspherical lens, or other camera lens. For example, the graphical user interface could provide a control for selecting a camera lens through which the location is being viewed.

Figure 6:
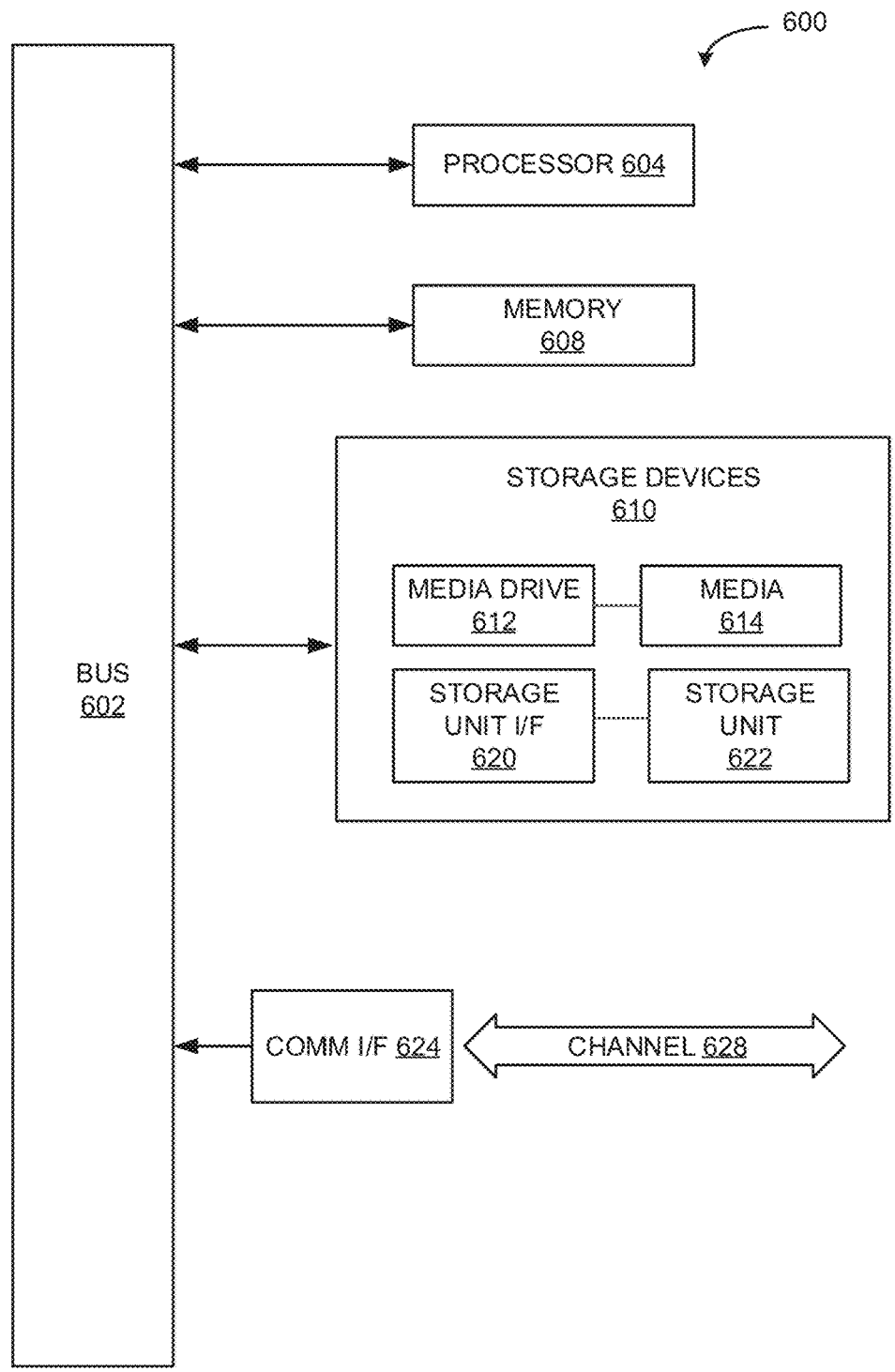
FIG. 6 illustrates an example computing module that may be used to implement various features of the system and methods disclosed herein.

FIG. 6 illustrates an example computing component that may be used to implement various features of the system and methods disclosed herein, such as the aforementioned features and functionality of one or more aspects of location simulation device 300.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 6. Various embodiments are described in terms of this example-computing module 600. After reading this description, it will become apparent to a person skilled in the relevant art how to implement the application using other computing modules or architectures.

Referring now to FIG. 6, computing module 600 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 600 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 600 might include, for example, one or more processors, controllers, control modules, or other processing devices, such as a processor 604. Processor 604 might be implemented using a general-purpose or special-purpose processing engine such as, for example, a microprocessor, controller, or other control logic. In the illustrated example, processor 604 is connected to a bus 602, although any communication medium can be used to facilitate interaction with other components of computing module 600 or to communicate externally.

Computing module 600 might also include one or more memory modules, simply referred to herein as main memory 608. For example, preferably random access memory (RAM) or other dynamic memory, might be used for storing information and instructions to be executed by processor 604. Main memory 608 might also be used for storing temporary variables or other intermediate information during execution of instructions to be executed by processor 604. Computing module 600 might likewise include a read only memory ("ROM") or other static storage device coupled to bus 602 for storing static information and instructions for processor 604.

The computing module 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid state drive, a magnetic tape drive, an optical disk drive, a CD or DVD drive (R or RW), or other removable or fixed media drive might be provided. Accordingly, storage media 614 might include, for example, a hard disk, a solid state drive, magnetic tape, cartridge, optical disk, a CD, DVD, or Blu-ray, or other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing module 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory module) and memory slot, a PCMCIA slot and card, and other fixed or removable storage units 622 and interfaces 620 that allow software and data to be transferred from the storage unit 622 to computing module 600.

Computing module 600 might also include a communications interface 624. Communications interface 624 might be used to allow software and data to be transferred between computing module 600 and external devices. Examples of communications interface 624 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 624 might typically be carried on signals, which can be electronic, electromagnetic (which includes optical) or other signals capable of being exchanged by a given communications interface 624. These signals might be provided to communications interface 624 via a channel 628. This channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer readable medium", "computer usable medium" and "computer program medium" are used to generally refer to non-transitory media, volatile or non-volatile, such as, for example, memory 608, storage unit 622, and media 614. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 600 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

What is claimed is:

1. A method, comprising:
capturing data of an outdoor, real-world location;
using the captured data, generating a three dimensional model of the outdoor, real-world location;
presenting a graphical user interface to a user for simulating lighting of the location under a plurality of sun conditions, wherein lighting of the location is simulated using the three dimensional model;
receiving data corresponding to user input at the graphical user interface actuating a graphical user interface control for selecting one of the plurality of sun conditions; and
in response to receiving the data, rendering the three dimensional model of the location with lighting based on the selected sun condition.

2. The method of claim 1, wherein lighting of the location is simulated using a sun model comprising a plurality of illumination parameters, the plurality of illumination parameters comprising at least one of: sun position or direction, sun angular variation, sun spatial variation, and sun color.

3. The method of claim 2, wherein rendering the three dimensional model of the location with lighting based on the selected sun condition comprises applying the selected sun condition to the sun model.

4. The method of claim 3, further comprising: displaying the graphical user interface control, wherein the graphical user interface control is associated with a time of day, and wherein the user input actuating the graphical user interface control comprises selecting a time of day to simulate lighting conditions of the location.

5. The method of claim 2, further comprising: selecting the sun model to simulate lighting of the location, wherein the sun model is selected using at least one of: geographical identification metadata identifying a location of the outdoor, real-world location, weather data of the of the outdoor, real-world location, and a time of day in which the lighting of the location is being simulated.

6. The method of claim 1, further comprising: receiving geographical identification metadata identifying a location of the outdoor, real-world location, and wherein lighting of the location is simulated using the geographical identification metadata.

7. The method of claim 1, further comprising: receiving weather data of the outdoor, real-world location, and wherein lighting of the location is simulated using the weather data.

8. The method of claim 1, wherein capturing data of the outdoor, real-world location comprises capturing a plurality of digital images using an unmanned aerial vehicle, and wherein the plurality of captured digital images are used to generate the three-dimensional model.

9. The method of claim 1, wherein capturing data of the outdoor, real-world location comprises scanning the outdoor, real-world location using a LIDAR unit attached to an unmanned aerial vehicle, and wherein generating the three-dimensional model comprises generating a three-dimensional point cloud using data acquired by the LIDAR unit.

10. The method of claim 1, wherein a head mounted display renders the three dimensional model of the location with lighting based on the selected sun condition.

11. The method of claim 1, wherein lighting of the location is simulated using a sky model comprising a plurality of illumination parameters, the sky illumination parameters comprising at least one of: sky color, sky angular variation, sky turbidity, or the zenith angle of light direction.

12. A system, comprising:
a non-transitory computer-readable medium operatively coupled to a processor and having instructions stored thereon that, when executed by the processor, causes the system to:
receive captured data of an outdoor, real-world location;
using the captured data, generate a three dimensional model of the outdoor, real-world location;
present a graphical user interface to a user for simulating lighting of the location under a plurality of sun conditions, wherein lighting of the location is simulated using the three dimensional model;
receive data corresponding to user input at the graphical user interface actuating a graphical user interface control for selecting one of the plurality of sun conditions; and
in response to receiving the data, render the three dimensional model of the location with lighting based on the selected sun condition.

13. The system of claim 12, wherein lighting of the location is simulated using a sun model comprising a plurality of illumination parameters, the illumination parameters comprising at least one of: sun position or direction, sun angular variation, sun spatial variation, and sun color.

14. The system of claim 13, wherein rendering the three dimensional model of the location with lighting based on the selected sun condition comprises applying the selected sun condition to the sun model.

15. The system of claim 14, wherein the instructions, when executed by the processor, further cause the system to: display the graphical user interface control, wherein the graphical user interface control is associated with a time of day, and wherein the user input actuating the graphical user interface control comprises selecting a time of day to simulate lighting conditions of the location.

16. The system of claim 12, wherein the instructions, when executed by the processor, further cause the system to: receive geographical identification metadata identifying a location of the outdoor, real-world location, and wherein lighting of the location is simulated using the geographical identification metadata.

17. The system of claim 12, wherein the instructions, when executed by the processor, further cause the system to: receive weather data of the outdoor, real-world location, and wherein lighting of the location is simulated using the weather data.

18. The system of claim 12, further comprising: an unmanned aerial vehicle, wherein the unmanned aerial vehicle is configured to capture the data of the outdoor, real-world location by capturing a plurality of digital images of the outdoor, real-world location, and wherein the plurality of captured digital images are used to generate the three-dimensional model.

19. The system of claim 12, further comprising: an unmanned aerial vehicle, wherein the unmanned aerial vehicle is configured to capture the data of the outdoor, real-world location using a LIDAR unit attached to the unmanned aerial vehicle, and wherein generating the three-dimensional model comprises generating a three-dimensional point cloud using data acquired by the LIDAR unit.

20. The system of claim 12, wherein the system comprises a head mounted display, wherein the head mounted display is configured to render the three dimensional model of the location with lighting based on the selected sun condition.

21. The system of claim 12, wherein lighting of the location is simulated using a sky model comprising a plurality of illumination parameters, the sky illumination parameters comprising at least one of: sky color, sky angular variation, sky turbidity, or the zenith angle of light direction.

22. The system of claim 12, wherein the instructions, when executed by the processor, further cause the system to: select the sun model to simulate lighting of the location, wherein the sun model is selected using at least one of: geographical identification metadata identifying a location of the outdoor, real-world location, weather data of the of the outdoor, real-world location, and a time of day in which the lighting of the location is being simulated.

\* \* \* \* \*